July 8, 1952 L. E. NORTON 2,602,897

STABILIZATION OF MICROWAVE OSCILLATORS

Filed Sept. 18, 1948 2 SHEETS—SHEET 1

INVENTOR
Lowell E. Norton
BY J. L. Whittaker
ATTORNEY

STABILIZATION OF MICROWAVE OSCILLATORS

Filed Sept. 18, 1948 2 SHEETS--SHEET 2

INVENTOR
Lowell E. Norton
BY J. L. Whittaker
ATTORNEY

Patented July 8, 1952

2,602,897

UNITED STATES PATENT OFFICE 2,602,897

STABILIZATION OF MICROWAVE OSCILLATORS

Lowell E. Norton, Princeton, N. J., assignor to Radio Corporation of America, a corporation of Delaware Application September 18, 1948, Serial No. 49,934

19 Claims. (Cl. 250—36)

This invention relates to methods and systems for stabilizing the frequency of microwave oscillators by utilization of sharp molecular resonance exhibited by certain gases at microwave frequencies.

The microwave absorption spectra of certain gases, including ammonia, carbonyl sulphide and methyl halides, comprise lines of distinctive frequency distribution for the different gases. At very low pressures, these lines, or absorption regions, may break up into a plurality of sharply defined lines, each corresponding with a sharp molecular resonance characteristic unaffected by ambient temperature, pressure and other common variables.

In accordance with the present invention, the carrier frequency of the microwave oscillator is modulated to produce side-band frequencies, at least two of which are on opposite slopes of one molecular resonance characteristic selected to correspond with the desired operating frequency of the microwave oscillator. In their passage through the gas, this pair of side-band frequencies is differentially varied in amplitude and phase, in accordance with the sense and extent of deviation from the desired operating frequency. The resulting difference in amplitude or phase of the side-band frequencies is utilized to vary the frequency of the microwave oscillator in compensation for its deviation.

More particularly, in some forms of the invention the output of the microwave oscillator is impressed upon two channels, each including a mixer upon which the outputs of the microwave oscillator and a low-frequency oscillator are impressed. A resulting side-band frequency in each channel is impressed upon a gas cell, the gas cells differentially varying the amplitude or phase of the selected side bands which are thereafter demodulated and the resultant outputs of the channels utilized as an error control voltage for the microwave oscillator.

In other forms of the invention, there is included in one of the channels, beyond the gas cell, a mixer upon which are impressed the lower side-band frequency and a beat-frequency equal to the difference between the side-band frequencies so to provide that the outputs of the channels shall include components having the same frequency but with a phase-difference varying in accordance with the frequency-deviation of the microwave oscillator; in a preferred form, the difference-frequency is produced by impressing the outputs of the modulating oscillators upon a mixer whose output, in turn, is applied to a mixer upon which is also impressed the lower side-band frequency.

In still another modification of the invention, the output of the microwave oscillator is applied to a balanced modulator in advance of the gas cell and upon which is also impressed the output of a low-frequency modulating oscillator to produce side-bands on opposite slopes of a molecular resonance characteristic of the gas. The output of the gas cell is heterodyned with oscillations of frequency corresponding with the difference between the side-band frequencies so to produce two equal frequencies of phase-difference varying in dependence upon deviations from the desired operating frequency of the microwave oscillator.

The invention further resides in methods and systems having the features hereinafter described and claimed.

For a more detailed understanding of the invention and for illustration of systems utilizing it, reference is made to the accompanying drawings, in which.

As more fully discussed in my copending applications, Serial Numbers 8,246, 6,975, and 35,185, now Patent No. 2,584,608, many gases under reduced pressure exhibit a fine line absorption effect at microwave frequencies; in the case of ammonia, for example, many sharp resonances occur within a comparatively narrow frequency range, in the neighborhood of a frequency corresponding with 1.25 centimeters wavelength.

Figures 1, 2, 3, 4:
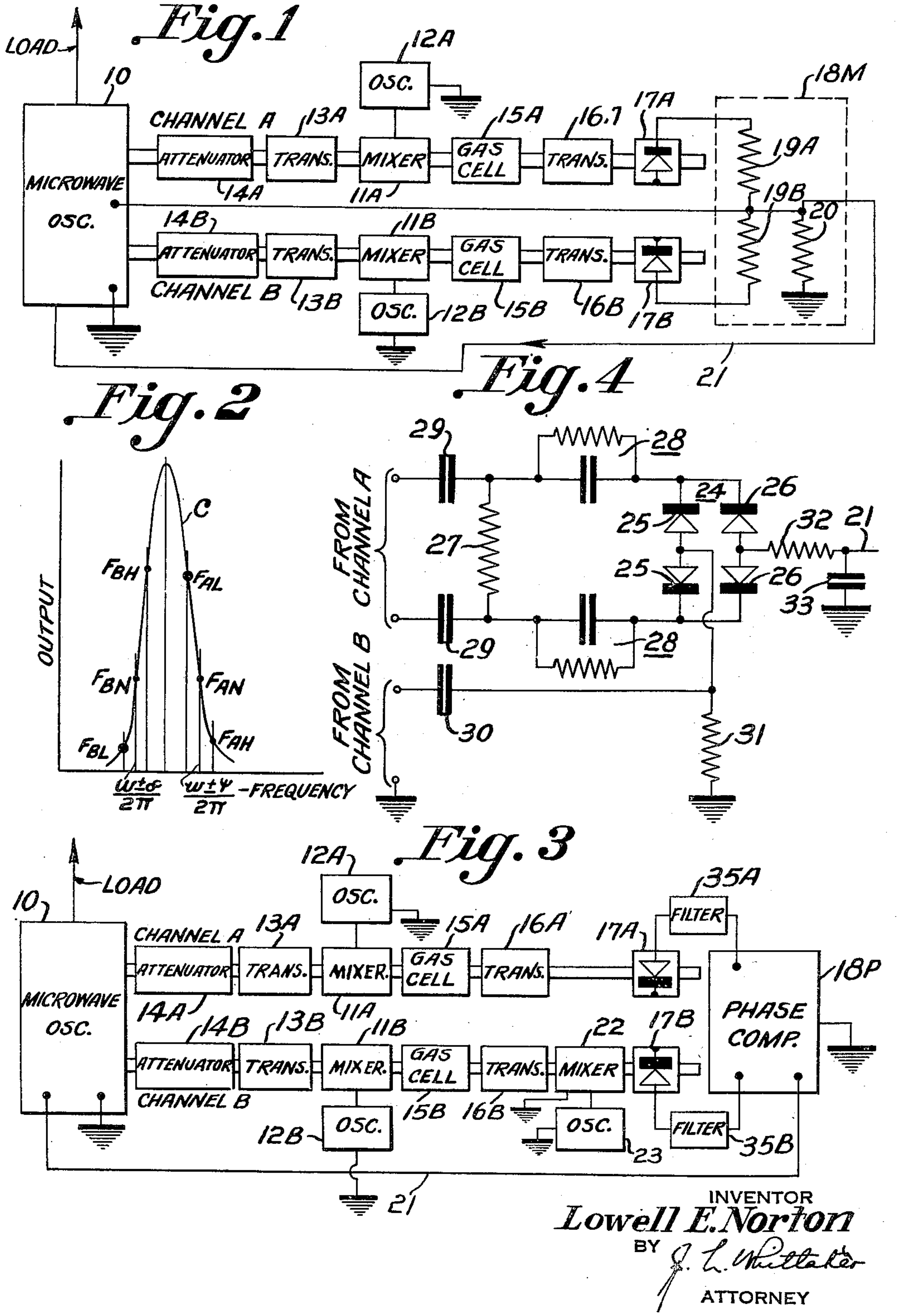
Figure 1 is a block diagram of a stabilized oscillator system using two control channels whose outputs are impressed upon an amplitude-comparison network for control of the oscillator frequency.
Figure 2 is an explanatory figure referred to in discussion of the operation of the system of Figure 1.
Figure 3 is a block diagram of a modification of Figure 1 in which the outputs of the two control channels are impressed upon a phase-comparison network.
Figure 4 is a schematic diagram of part of the phase-comparison network of Figure 3.

In the system shown in Figure 1, the microwave oscillator 10 is to be stabilized at a selected one of these molecular resonance frequencies. The oscillator 10 is connected to the load and to control channels A, B which most conveniently are waveguides, although coaxial lines may also be used. The output frequency ($\omega/2\pi$) of oscillator 10 and the output frequency ($\psi/2\pi$) of a low-frequency oscillator 12A are impressed upon a mixer 11A in channel A. The modulating oscillator 12A operates under close frequency control as afforded, for example, by a piezoelectric crystal and applies a suitably high voltage to the mixer 11A which may be a diode or a crystal rectifier of the silicon, germanium, or like type. The mixer 11A therefore generates side-band frequencies $$\frac{\omega+\psi}{2\pi} \text{ and } \frac{\omega-\psi}{2\pi}$$

which are propagated in both directions from the mixer in channel A. However, an attenuator 14A connected between mixer 11A and the oscillator 10 prevents interaction of the side-band propagation from mixer 11A with side-band propagation from mixer 11B in channel B. An impedance-matching transformer 13A, of any suitable type for microwave frequencies, is preferably connected between the mixer 11A and the attenuator 14A.

The frequency of modulating oscillator 12A is so chosen that one of the aforesaid side-band frequencies falls on one slope of the chosen gas line exemplified, on expanded frequency-scale, by curve C of Figure 2. For purposes of explanation, it is assumed the side-band frequency $$\frac{\omega+\psi}{2\pi}$$

generated by mixer 11A falls on point $F_{AN}$ of the righthand slope of the curve when the operating frequency of oscillator 10 is at its desired value. The side-band energy in its transmission through the gas cell 15A is subject to attenuation and phase-shift predetermined by the molecular resonance curve C. The gas cell 15A may, as more fully described in copending application Serial No. 786,736, filed November 18, 1947, comprise a resonant chamber or a section of waveguide having gas-tight windows at opposite ends thereof of mica or other suitable material providing a gas-tight seal which is transparent to microwave energy. The side-band energy as transmitted through gas cell 15A is impressed upon a demodulator 17A, such as a crystal rectifier or equivalent, to produce a unidirectional voltage of magnitude dependent upon the amplitude of the transmitted side band. As some of the gas lines have an equivalent Q of about 70,000 the frequency-amplitude characteristic of the transmission through the gas is very sensitive to frequency changes. As indicated in Figure 2, a minute change in frequency causes the amplitude abruptly to rise from $F_A$ to point $F_{AL}$ or abruptly to fall to point $F_{AH}$.

Preferably, as indicated in Figure 1, matching transformers 16A and 16B are interposed between the gas cells and their associated demodulators 17A and 17B.

In channel B, the output frequency of the microwave oscillator 10 is impressed upon a mixer 11B upon which is also impressed the output of a low-frequency modulator 12B similar to oscillator 12A but whose frequency $$\frac{\alpha}{2\pi}$$

is so chosen that one of the side-band frequencies $$\frac{\omega+\alpha}{2\pi} \text{ or } \frac{\omega-\alpha}{2\pi}$$

normally falls at point $F_{BN}$ on the lefthand slope of the gas-absorption line C, Figure 2. The two side-band frequencies generated by mixer 11B are propagated in both directions from the mixer in channel B but attenuator 14B prevents or minimizes their interaction with the side bands generated in channel A. As in channel A, an impedance-matching transformer 13B is preferably interposed between mixer 11B and the preceding portion of the transmission line. The output of mixer 11B is impressed upon the gas cell 15B, the selected side band, for example $$\frac{\omega+\alpha}{2\pi}$$

which falls upon the slope of the absorption line C being subjected to large changes in attenuation and phase-shift as the microwave oscillator frequency $$\frac{\omega}{2\pi}$$

deviates from the desired value. Specifically, in the case assumed, when the oscillator frequency $$\frac{\omega}{2\pi}$$

rises but to slight extent, the amplitude of the selected side-band energy in channel B as transmitted by gas cell 15B rises abruptly from point $F_{BN}$, Figure 2, to point $F_{BH}$ and abruptly falls to point $F_{BL}$ for slight decrease in the frequency of oscillator 10.

It is particularly to be noted that for an increase, for example, in the frequency of oscillator 10, the output of channel B abruptly rises to point $F_{BH}$ whereas the output of channel A abruptly falls to point $F_{AH}$. On the contrary, for slight decrease of oscillator 10, the output of channel B abruptly falls toward point $F_{BL}$ and the output of channel $F_A$ abruptly rises to point $F_{AL}$. Thus a change in frequency of oscillator 10 differentially affects the amplitudes of the outputs of channels A and B effectively doubling the sensitivity already high because of the extreme steepness of the sides of the molecular resonance curve.

As indicated in Figure 1, the demodulators 17A and 17B are so poled that their unidirectional currents are additive in comparator network 18M which includes the resistors 19A—19B connected in series with the demodulators and a resistor 20 connected to the common terminal of resistors 19A, 19B.

Figure 6:
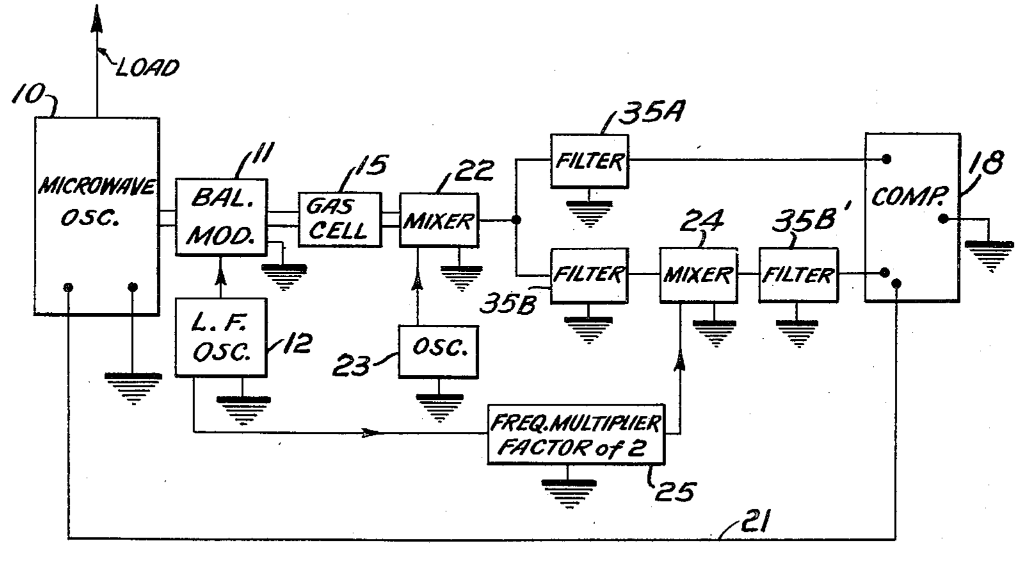
Figure 6 is a modification utilizing a balanced modulator.

The resistances of resistors 19A—19B are preferably equal and very large compared to the resistance of resistor 20 to minimize reaction between the demodulators. At the desired operating frequency of oscillator 10, the outputs of the two channels are equal and opposite and consequently the frequency-control voltage appearing between conductor 21 and ground, or other return-circuit, is zero. When the frequency of oscillator 10 increases or decreases from the desired value, the polarity and magnitude of the unidirectional potential derived from the outputs of channels A, B and impressed on conductor 21 will depend upon the sense and extent of the frequency-shift. The error-control voltage so derived may be applied in known manner to the microwave oscillator for stabilization of its operating frequency: for example, if the oscillator 10 is a klystron, the control voltage may be applied to vary the potential of the reflector electrode generally as shown in Figure 6 of aforesaid application Serial No. 35,185, or if the oscillator 10 is a magnetron, the control voltage may be applied to a frequency-control electrode generally as shown in Figure 7 of the same application. If the oscillator is a feedback type with inductance-capacitance frequency control, the control voltage actuates a reactance tube which, in turn, is connected to the oscillator.

The attenuators 14A and 14B of Figure 1 may be omitted and the oscillators 12A and 12B replaced by a single modulating oscillator, as in Figure 6, by using a balanced "magic T" modulator similar to that shown in Figure 3 of my copending application Serial No. 35,185. In such a balanced T modulator, because of the field symmetry, there is no propagation of side-band energy back into the microwave oscillator channel and consequently no need for any equivalent of attenuators 14A and 14B.

Except in respects as specifically discussed, the system of Figure 3 is similar to that of Figure 1: accordingly, corresponding elements have been identified by similar reference characteristics and the description of Figure 3 principally directed to its differences. As above mentioned, the side-band energies respectively lying on opposite sides of the sharp molecular resonance characteristic of the gas in cells 15A—15B are transmitted in channels A and B with phase-angle shifts dependent upon the frequency of oscillator 10, but as the frequencies are different, these phase-shifts in the outputs of the gas cells 15A, 15B cannot directly be compared for control of the frequency of oscillator 10. To provide for such comparison, there is included in the system of Figure 3 a beat-frequency oscillator 23 or equivalent for producing oscillations whose frequency is equal to the difference between the selected pair of side-band frequencies.

If the desired output frequency is lower than the center frequency of the selected gas resonance line, then for $\psi<\alpha$, side-band pairs $$\frac{\omega-\psi}{2\pi}, \frac{\omega+\alpha}{2\pi}; \frac{\omega+\psi}{2\pi}, \frac{\omega+\alpha}{2\pi}$$

are used in channels A and B if the output frequency is within the interval of the gas line. If the output frequency is outside the interval of the gas line then only side-band pairs $$\frac{\omega+\psi}{2\pi} \text{ and } \frac{\omega+\alpha}{2\pi}$$

are used in the two channels.

Conversely, for a desired output frequency higher than the selected gas absorption line frequency, the pairs of side bands for channels A and B are $$\frac{\omega+\psi}{2\pi}, \frac{\omega-\alpha}{2\pi}; \frac{\omega-\psi}{2\pi}, \frac{\omega-\alpha}{2\pi}$$

and $$\frac{\omega-\psi}{2\pi}, \frac{\omega-\alpha}{2\pi}$$

respectively, depending upon whether the output frequency is inside or outside the frequency interval of the gas line. This beat-frequency and the lower side-band frequency in channel B are impressed upon a mixer 22 whose output therefor includes a frequency which is equal to the higher side-band frequency in channel A but whose phase differs therefrom in accordance with the variations in frequency of oscillator 10.

The sign and magnitude of the phase angle between the outputs of the two channels may be measured by any suitable comparator 18P, such as shown, for example, in my copending applications Serial Nos. 8,246 and 6,975 to produce a frequency-control voltage transmitted by conductor 21 to the oscillator 10. Specifically, the output of one of the channels, for example, channel A, may be converted to pairs of sharp pulses applied to the rectifier bridge 24 comprising two pairs of rectifiers 25—25, 26—26 poled as indicated in Figure 4. The opposite ends of resistors 27 are connected to the bridge 24, each through a resistor-capacitor network 28 and are connected to the pulse-shaping circuits, not shown, from channel A through the coupling condensers 29, 29. The demodulated output of the other channel, specifically channel B, is applied to a sawtooth generating circuit, not shown, whose output is impressed upon the rectifier bridge 24 and a network including coupling condenser 30, resistors 31, 32 and bypass condenser 33. As more fully explained in my aforesaid copending application, there is thus produced a unidirectional voltage varying in sense and magnitude with the phase-angle between the outputs of the two channels. This resulting unidirectional voltage may be applied by conductor 21 to vary the frequency of oscillator 10, generally as above described, in compensation for any deviations from its desired operating frequency.

The foregoing will be more fully understood from the following mathematical discussion:

As already stated, either the side band $$\frac{\omega+\psi}{2\pi} \text{ or } \frac{\omega-\psi}{2\pi}$$

produced in channel A, is chosen to fall on one slope of the gas line; assuming the former, the field propagated through the gas may be expressed as:

$$e_1=E_1 \sin (\omega+\psi)\ t+\alpha \qquad (1)$$

where $\alpha$ is an arbitrary phase angle.

The propagation at the other side-band frequency, specifically $$\frac{\omega-\psi}{2\pi}$$

will be at constant amplitude since it is not within the frequency interval of the resonance curve. Moreover if there is some transmission of this frequency through the gas, there is no adverse effect because the phase-frequency characteristic at frequencies substantially higher and lower than the peak is essentially flat for small frequency increments. In other words, the non-selected side band will be propagated with practically constant phase for normally encountered frequency variations of the stabilized oscillator 10. The selected side-band propagation is combined with propagation at the carrier frequency which may be expressed as $$e_2=E_2 \sin \omega t \qquad (2)$$

If the mixer 15A or 15B has a square-law characteristic, its output may therefore be expressed as $$e_3=E_3\left[\frac{1-\cos 2\omega t}{2}+m \cos (4t+\alpha+\beta)-m \cos [(2\omega+\psi)t+\alpha+\beta]+\frac{m^2}{2}-\frac{m^2}{2} \cos \{2[(\omega+\psi)t+\alpha+\beta]\}\right] \qquad (3)$$

where $m$=modulation factor $\beta$=phase-shift due to gas resonance.

If the demodulator 17A is not square-law, additional higher order terms will appear. However, they are effectively removed by filter 35A which passes only the frequency $$\frac{\psi}{2\pi}$$

In similar manner, the oscillator 12B is closely regulated to produce modulating frequency $$\frac{\alpha}{2\pi}$$

which is impressed upon the mixer 11B to produce side bands $$\frac{\omega+\alpha}{2\pi} \text{ and } \frac{\omega-\alpha}{2\pi}$$

one of which falls on the other slope of the resonance curve of the gas; it is assumed for simplicity of explanation that the former falls on the lefthand slope of the gas line, Figure 2. The mixer output may therefore be expressed as $$e_{11}=E_{11}\sin\left[(\omega+\alpha)t+\alpha_1\right] \qquad (4)$$

where $\alpha_1$ is an arbitrary phase angle.

This side-band propagation is combined with the carrier propagation and the resultant fields are applied to the demodulator 17B whose output may therefore, assuming a square-law response, be expressed as $$e_4=E_4\left[\frac{1-\cos 2\omega t}{2}+m\cos(\psi t+\alpha_1+\beta_1)-m\cos[(2\omega+\psi)t+\alpha_1+\beta_1]+\frac{m^2}{2}-\frac{m^2}{2}\cos\{2[(\omega+\psi)t+\alpha_1+\beta_1]\}\right] \qquad (5)$$

where $m$ is the modulation factor
$\beta$ is the phase-shift due to the gas.

The outputs of the two channels may therefore be expressed as:

(Channel A) $e_5=E_5\cos(\psi t+\alpha+\beta)$
(Channel B) $e_6=E_6\cos(\psi t+\alpha_1+\beta_1)$ The phase angles $\alpha$ and $\alpha_1$ are constant, whereas the phase angles $\beta$ and $\beta_1$ which are opposite in algebraic sign since they are derived from frequency changes on opposite slopes of the same resonance characteristic, depend upon the frequency-phase characteristics of the gas and are subject to large variation for small deviations in frequency of oscillator 10.

Figure 5:
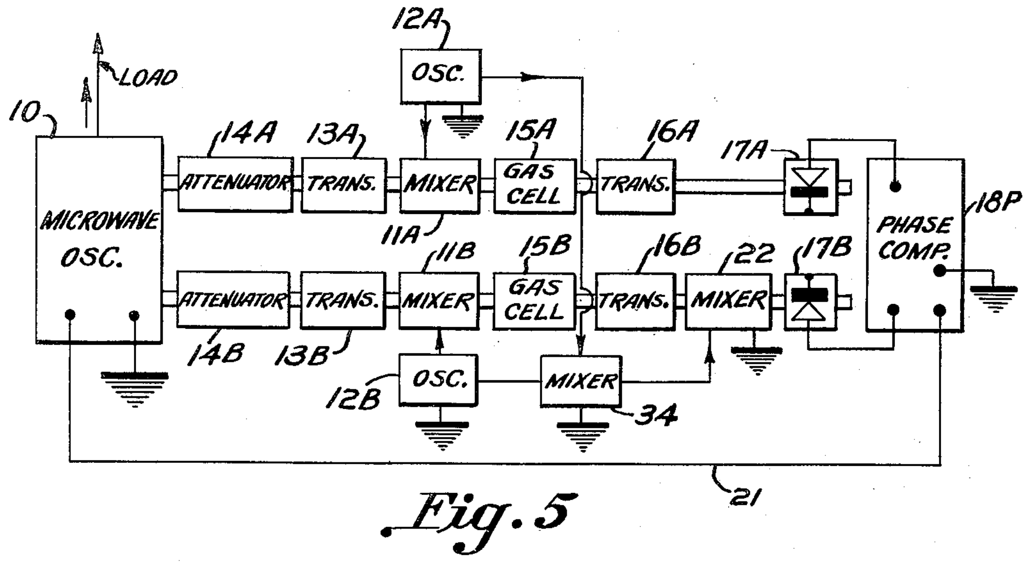
Figure 5 is a modification of the system of Figure 3.

The frequency-stabilizing system shown in Figure 5 is similar to that of Figure 3 except that the beat-frequency applied to mixer 22 is not produced by an additional oscillator 23. Instead, the outputs of the modulating oscillators 12A, 12B are impressed upon a mixer 34 of any suitable type so to produce a beat-frequency equal to the difference between the two chosen side-band frequencies. The beat-frequency applied to mixer 22 of Figure 5 is therefore always equal to the difference in side-band frequencies notwithstanding any instability of either or both of the modulating oscillators 12A, 12B. In this respect the system of Figure 5 is to be preferred, as it is not necessary so rigidly to control the frequency of the modulating oscillators.

Further explanation of the system of Figure 5 appears unnecessary, as the corresponding elements of both systems are identified by similar reference characters and the previous general description of Figure 3 directly applies to Figure 5.

In the system shown in Figure 6, which is somewhat simpler than that of preceding modifications, the output of a single low-frequency modulating oscillator 12 is impressed upon a balanced modulator 11 interposed between the gas cell 15 or equivalent and the microwave oscillator 10. The output of the balanced modulator 11 therefore comprises two side-band frequencies only, the carrier frequency being suppressed. The frequency $$\left(\frac{\psi}{2\pi}\right)$$

of oscillator 12 is so chosen that as in the preceding modifications, the two side-band frequencies are respectively located on opposite slopes of the selected resonance characteristic of the gas in cell 15. In their transmission through the gas cell, the side bands $$\frac{\omega+\psi}{2\pi}$$

and $$\frac{\omega-\psi}{2\pi}$$

are subjected to attenuations and phase-shifts differentially in accordance with deviations of the frequency of oscillator 10 from the desired operating frequency.

It is convenient to connect the same beat oscillator 23 to the mixer to beat the two side bands to lower frequencies where phase or amplitude comparison is easier. These two side bands so transmitted are selected by filters 35A, 35B and either the difference in their amplitudes or the difference in their phase-angle may be measured by comparator 18 and used to regulate the frequency of oscillator 10 as above described in connection with Figure 1 for amplitude comparison or Figures 3 and 5 for phase comparison.

When phase comparison control is employed, there is additionally required, as in Figure 3, a mixer 24 and a source of voltage at twice the frequency of oscillator 12. The double frequency voltage may be obtained from a frequency multiplier 25 as shown or from a separate oscillator. In either case the frequency of the potential supplied to mixer 24 is equal to the difference between the side-band frequencies so that the outputs of filters 35A and 35B′ are two equal frequencies with a phase-difference differentially varying with deviation from normal of the frequency of microwave oscillator 10, generally as discussed in connection with Figures 3 and 5.

It shall be understood the invention is not limited to the exemplary systems specifically described and that changes and modifications may be made within the scope of the appended claims.

What is claimed is:

1. The method of stabilizing the operating frequency of a microwave generator by utilization of a sharp molecular resonance characteristic of a gas which comprises modulating the oscillations produced by said generator to produce side-band frequencies on opposite slopes of said resonance characteristic, transmitting said side bands through said gas, demodulating the transmitted side bands, and deriving from the demodulated side bands a frequency-control signal applied to said oscillator in compensation for deviations from its desired operating frequency.

2. The method of stabilizing the frequency of a microwave generator by utilization of a sharp molecular resonance characteristic of a gas which comprises modulating the oscillations produced by said generator to produce side-band frequencies on opposite slopes of said resonance characteristic, transmitting said side bands through said gas differentially to vary their amplitudes upon deviation from the desired frequency of the generated oscillations, demodulating said side-bands as transmitted by said gas, deriving from the demodulated side bands a unidirectional voltage whose amplitude varies in sense and to extent dependent upon the sense and extent of deviations of the generator frequency, and applying said unidirectional voltage to said generator to correct for said deviations of its frequency.

3. The method of stabilizing the frequency of a microwave generator by utilization of a sharp molecular resonance characteristic of a gas which comprises modulating the oscillations produced by said generator to produce side-band frequencies on opposite slopes of said resonance characteristic, transmitting said side-band frequencies through said gas to shift their phases in accordance with deviations from the desired operating frequency of said generator, mixing one of said side-band frequencies with oscillations of frequency equal to the difference between said side-band frequencies to produce a frequency equal to the unmixed side-band frequency and with a phase-difference corresponding with the sense of deviation of the generator frequency, and varying a frequency-control voltage of said generator in accordance with said phase difference.

4. The method of stabilizing the operating frequency of a microwave oscillator by utilization of the sharp molecular resonance characteristic of a gas absorption line, which comprises impressing output energy from the oscillator upon transmission channels each including gas exhibiting molecular resonance at the desired operating frequency, mixing the oscillator energy in each channel with the output of a stable low-frequency oscillator to produce side-band frequencies on opposite slopes of said gas resonance characteristic, demodulating the side bands as transmitted by said gas, and deriving from the demodulated side bands a unidirectional frequency-control signal applied to said oscillator.

5. The method of stabilizing the operating frequency of a microwave oscillator by utilization of the sharp molecular resonance characteristic of a gas which comprises impressing output energy of the oscillator upon transmission channels each including gas exhibiting molecular resonance, mixing the oscillator energy in said channels in advance of the gas with low-frequency oscillations to produce side-band frequencies respectively on opposite sides of said resonance characteristic, demodulating the side bands as transmitted by the gas to produce unidirectional voltages varying differentially with deviation of the operating frequency, and applying the resultant of said unidirectional voltages to said oscillator for control of its operating frequency.

6. The method of stabilizing the operating frequency of a microwave oscillator by utilization of a sharp molecular resonance characteristic of a gas which comprises impressing output energy of the oscillator energy upon transmission channels each including gas exhibiting molecular resonance, in each channel and in advance of said gas modulating the oscillator energy to produce side-band frequencies on opposite slopes of said resonance characteristic, mixing one of said side-band frequencies as transmitted by the gas with oscillations of frequency equal to the difference between said side-band frequencies to produce a frequency equal to the unmixed side-band frequency and with a phase-difference dependent upon deviation from the desired operating frequency, and varying a frequency-control voltage of said oscillator in accordance with said phase-difference.

7. The method of stabilizing the operating frequency of a microwave generator by utilization of a sharp molecular-resonance characteristic of a gas which comprises impressing output energy of the oscillator upon transmission channels including gas exhibiting molecular resonance, in each channel in advance of the gas mixing the outputs of said generator and a low-frequency oscillator to produce side-band frequencies in different channels which are respectively on opposite slopes of said resonance characteristic, mixing the outputs of said low-frequency oscillators to produce a beat-frequency, mixing said beat-frequency and one of said side-band frequencies as transmitted by the gas to produce a frequency equal to the unmixed side-band frequency and with a phase-difference corresponding with deviation from the desired operating frequency, and varying a frequency-control voltage of said oscillator in accordance with said phase-difference.

8. The method of stabilizing the operating frequency of a microwave generator by utilization of the sharp molecular resonance characteristic of a gas which comprises impressing the output signals of said generator and a low-frequency oscillator upon a balanced modulator to produce side-bands on opposite slopes of said resonance characteristic, impressing said side-bands upon said gas, mixing the side bands as transmitted by said gas with oscillations of frequency equal to the difference between them to produce outputs of similar frequency but differing in phase and amplitude in accordance with deviation from the desired operating frequency, and varying a frequency-control voltage of said generator in accordance with the difference between said outputs.

9. The method of stabilizing the operating frequency of an oscillation generator by utilization of the sharp resonance characteristic of a high-Q circuit element which comprises modulating the generated oscillations to produce side-band frequencies on opposite slopes of said resonance characteristic, impressing the side-bands upon said circuit element for transmission thereof with attenuations and phase-shifts differentially varying in accordance with deviation from the desired operating frequency of said generator, demodulating the transmitted side bands, and varying the frequency of said generator in accordance with demodulation components of the side bands in compensation for deviations from the desired frequency.

10. A system for stabilizing the operating frequency of a microwave generator by utilization of a sharp molecular resonance characteristic of a gas which comprises means for modulating the oscillations produced by said generator to produce side-band frequencies on opposite slopes of said resonance characteristic, means for transmitting said side bands through said gas, means for demodulating the transmitted side bands, and means for deriving from the demodulated side bands a frequency-control signal applied to said oscillator in compensation for deviations from its desired operating frequency.

11. A system for stabilizing the operating frequency of a microwave generator comprising two transmission channels each including a cell containing gas having a sharp molecular resonance characteristic and a mixer between said cell and said generator, low frequency oscillators respectively connected to said mixers to produce side-band frequencies respectively on opposite slopes of said resonance characteristic and respectively transmitted by said cells with attenuations differentially dependent upon the sense of deviation from the desired operating frequency, means including demodulators in said channels beyond the respective gas cells for producing channel outputs whose amplitudes differentially vary with deviation of the operating frequency, and control means for varying the frequency of said generator in accordance with the sense and magnitude of the difference in amplitudes of said channel outputs.

12. A system for stabilizing the operating frequency of a microwave generator comprising two transmission channels each including a cell containing gas having a sharp molecular resonance characteristic and a mixer between said cell and said generator, low-frequency oscillators respectively connected to said mixers to produce side-band frequencies respectively on opposite slopes of said resonance characteristic and respectively transmitted by said cells with phase-shifts differentially dependent upon the sense of deviation from the desired operating frequency, means including demodulators in said channels beyond the respective gas cells for producing channel outputs whose phase-difference corresponds with deviations from the desired operating frequency, and control means for correcting the frequency of said generator in accordance with variations of said phase-difference.

13. A system for stabilizing the operating frequency of a microwave generator comprising two transmission channels each including a cell containing gas having a sharp molecular resonance characteristic and a mixer between said cell and said generator, low-frequency oscillators respectively connected to said mixers to produce side-band frequencies respectively on opposite slopes of said resonance characteristic and respectively transmitted with phase shifts differentially dependent upon the sense of deviation from the desired operating frequency, means for producing oscillations whose frequency equals the difference between said side-band frequencies, mixing means upon which the lower of said side bands and said oscillations are impressed to produce in the corresponding channel an output frequency equal to the output frequency of the other channel, and control means for regulating the operating frequency of said generator in accordance with the difference in phase of the outputs of said channels.

14. A system for stabilizing the operating frequency of a microwave generator comprising two transmission channels each including a cell containing gas having a sharp molecular resonance characteristic and a mixer between said cell and said generator, low-frequency oscillators respectively connected to said mixers to produce side-band frequencies respectively on opposite slopes of said resonance characteristic and respectively transmitted with phase-shifts differentially dependent upon the sense of deviation from the desired operating frequency, a beat oscillator whose frequency equals the difference between said side-band frequencies, mixing means upon which the lower of said side-band frequencies and the beat-frequency are impressed to produce in the corresponding channel an output frequency equal to the output frequency of the other channel, and control means for regulating the operating frequency of said microwave generator in accordance with the difference in phase of the outputs of said channels.

15. A system for stabilizing the operating frequency of a microwave generator comprising two transmission channels each including a cell containing gas having a sharp molecular resonance characteristic and a mixer between said cell and said generator, low frequency oscillators respectively connected to said mixers to produce side-band frequencies respectively on opposite slopes of said resonance characteristic and respectively transmitted with phase-shifts differentially dependent upon the sense of deviation from the desired operating frequency, mixing means connected to said low-frequency oscillators to produce a beat-frequency equal to the difference between said side-band frequencies, mixing means upon which the beat-frequency and the lower of said side-band frequencies are impressed to produce in the corresponding channel an output frequency equal to the output frequency of the other channel, and control means for regulating the operating frequency of said microwave generator in accordance with the difference in phase of the outputs of said channels.

16. A system for stabilizing the operating frequency of a microwave generator comprising a transmission channel including a cell containing gas having a sharp molecular resonance characteristic, a balanced modulator included in said channel between said gas cell and said microwave generator, a low-frequency oscillator connected to said modulator to produce side-band frequencies respectively on opposite slopes of said resonance characteristic and transmitted by said gas with attenuations and phase-shifts differentially varying with deviation from the desired operating frequency of said microwave generator, a mixer upon which the transmitted side-bands are impressed, a beat-frequency oscillator connected to said mixer to produce output components of said channel which are of the same frequency but differ in phase and amplitude, and control means for regulating the operating frequency of said microwave generator in accordance with differences between said output components.

17. A system for stabilizing the operating frequency of a microwave generator comprising a transmission channel including a cell containing gas having a sharp molecular resonance characteristic, a balanced modulator included in said channel between said gas cell and said microwave generator, a low-frequency oscillator connected to said modulator to produce side-band frequencies respectively on opposite slopes of said resonance characteristic and transmitted by said gas with attenuations and phase-shifts differentially varying with deviation from the desired operating frequency of said microwave generator, a mixer upon which the transmitted side-bands are impressed, a beat-frequency oscillator connected to said mixer to produce output components of said channel which are of the same frequency but differ substantially only in phase, and control means for regulating the operating frequency of said microwave generator in accordance with differences between said output components.

18. A system for stabilizing the operating frequency of a microwave generator comprising a transmission channel including a cell containing gas having a sharp molecular resonance characteristic, a balanced modulator included in said channel between said gas cell and said microwave generator, a low-frequency oscillator connected to said modulator to produce side-band frequencies respectively on opposite slopes of said resonance characteristic and transmitted by said gas with attenuations and phase-shifts differentially varying with deviation from the desired operating frequency of said microwave generator, a mixer upon which the transmitted side-bands are impressed, means for providing control signals to provide output signal components which differ substantially only in amplitude, and control means for regulating the operating frequency of said microwave generator in accordance with differences between said output components.

19. A system for stabilizing the operating frequency of a microwave generator comprising two transmission channels at least one channel including a cell containing gas having a sharp molecular resonance characteristic and a mixer between said cell and said generator, a low frequency oscillator connected to said mixer to produce side-band frequencies respectively on opposite slopes of said resonance characteristic and respectively transmitted with phase shifts differentially dependent upon the sense of deviation from the desired operating frequency, means for producing oscillations whose frequency equals the difference between said side-band frequencies, mixing means upon which the lower of said side bands and said oscillations are impressed to produce in the corresponding channel an output frequency equal to the output frequency of the other channel, and control means for regulating the operating frequency of said generator in accordance with the difference in phase of the outputs of said channels.

LOWELL E. NORTON.

REFERENCES CITED

The following references are of record in the file of this patent:

UNITED STATES PATENTS

| Number | Name | Date |
|---|---|---|
| 1,889,083 | Wintringham | Nov. 29, 1932 |
| 2,425,981 | Bard et al. | Aug. 19, 1947 |